US005315058A

United States Patent [19]

Okamoto et al.

[11] Patent Number: 5,315,058

[45] Date of Patent: May 24, 1994

[54] ELECTRONIC MUSICAL INSTRUMENT HAVING ARTIFICIAL STRING SOUND SOURCE WITH BOWING EFFECT

[75] Inventors: Tetsuo Okamoto; Satoshi Usa, both of Hamamatsu, Japan

[73] Assignee: Yamaha Corporation, Hamamatsu, Japan

[21] Appl. No.: 855,800

[22] Filed: Mar. 23, 1992

[30] Foreign Application Priority Data

Mar. 26, 1991 [JP] Japan ........................ 3-84421

[51] Int. Cl.[5] ........................ G10H 7/00; G10H 1/02; G01P 3/00

[52] U.S. Cl. ........................ 84/626; 84/622; 84/659; 84/661; 84/662

[58] Field of Search ........................ 84/622, 623, 626, 659, 84/661, 662, 658

[56] References Cited

U.S. PATENT DOCUMENTS

| | | | |
|---|---|---|---|
| 4,779,505 | 10/1988 | Suzuki | 84/626 |
| 4,868,869 | 9/1989 | Kramer | 84/622 X |
| 4,984,276 | 1/1991 | Smith | 84/630 X |
| 4,991,218 | 2/1991 | Kramer | 84/622 X |
| 5,086,685 | 2/1992 | Hanzawa et al. | 84/622 X |
| 5,090,291 | 2/1992 | Schwartz | 84/603 |
| 5,113,743 | 5/1992 | Higashi | 84/622 |
| 5,117,729 | 6/1992 | Kunimoto | 84/660 |
| 5,192,826 | 3/1993 | Aoki | 84/662 |
| 5,200,568 | 4/1993 | Fukushima et al. | 84/658 |
| 5,239,123 | 8/1993 | Fujita | 84/672 X |
| 5,241,126 | 8/1993 | Usa et al. | 84/615 |
| 5,246,487 | 9/1993 | Oguri | 84/622 X |
| 5,247,131 | 9/1993 | Okamoto et al. | 84/661 X |
| 5,252,773 | 10/1993 | Kozuki et al. | 84/661 X |

*Primary Examiner*—William M. Shoop, Jr.
*Assistant Examiner*—Jeffrey W. Donels
*Attorney, Agent, or Firm*—Graham & James

[57] ABSTRACT

An electronic musical instrument has an electronic sound source of a physical model simulating the sound mechanism of an acoustic mechanical instrument, in particular, a stringed instrument of the bowing type. The electronic sound source is controlled according to tone pitch information and tone information determining a characteristic of a musical tone to be generated. A keyboard is provided as a data input device by which tone pitch is designated and on which a performance manner is expressed via initial touch and after touch. A memory stores two sets of performance information, each set containing bowing force and bowing velocity information. An interpolating unit operates to access the memory for carrying out interpolation between the two sets of performance information according to the performance manner, and produces respective interpolated performance information regarding bowing force and bowing velocity information effective to control the artificial sound source. The electronic sound source is also controlled by the interpolated performance information.

27 Claims, 8 Drawing Sheets

ELECTRONIC MUSICAL INSTRUMENT HAVING ARTIFICIAL STRING SOUND SOURCE WITH BOWING EFFECT

BACKGROUND OF THE INVENTION

The present invention relates to an electronic musical instrument utilizing an artificial or electronic sound source of a physical model simulating the sound mechanism of an acoustic musical instrument.

There has been known conventional electronic musical instruments of the keyboard type provided with a plurality of keys. In such electronic keyboard instruments, the player depresses keys to input performance information such as key code, initial touch and after touch. The electronic musical instrument has therein an electronic sound source directly receiving the performance information so as to form musical tones to be sounded as well a to effect modulation thereof.

On the other hand, there has been known an electronic sound source of a physical model which is composed of an electronic circuitry constructed to physically simulate the mechanical vibration system of an acoustic stringed instrument in order to generate continuous musical sounds analogous to, for example, violin performance. Such physical model sound source is disclosed, for example, in U.S. Pat. No. 4,984,276. In such a system, the instrument receives tone pitch information and performance information associated with bowing force and bowing velocity which represent bow manipulation in playing of an acoustic stringed instrument such as violin. The system operates according to the inputted information to generate musical sounds. The performance information of the physical model is manually inputted by the player to vary parameters or so called physical image such as bowing force and bowing velocity so as to sophisticatedly and naturally control musical tone volume and color in an analogous manner of the acoustic instrument according to the input performance even after initiation of the continuous sound generation.

As described, the physical model sound source synthesizes musical tones to simulate a sound generation mechanism of the acoustic musical instrument, hence the sound source must receive the physical model performance information which accurately represents the manner of manual playing. However, the typical performance tool or implement such as a keyboard can only input specified performance information pertinent to key operation. Since the keyboard is originally used as a operation implement for striking type of the stringed instrument, the keyboard mechanism is inconvenient in use as an input implement for sustained sound generation type or bowing type of the stringed instrument.

Generally, the keyboard is not suitable functionally for controlling a sustained music tone. In spite of such drawbacks or inconvenience, since the keyboard is usually installed in various types of the electronic musical instruments, the keyboard is necessarily used even for performing musics composed of sustained tones.

SUMMARY OF THE INVENTION

In view of the above noted drawbacks of the prior art, an object of the present invention is to, therefore, enable the typical input implement, e.g., keyboard to control a physical model sound source simulative of the bowing type string instrument for effectively generating musical sounds in analogous manner.

In order to achieve the object, the present invention is directed to the electronic musical instrument of the type equipped with an artificial sound source of the physical model simulative of a mechanical instrument and being receptive of performance information representative of parameters or physical image of the sound source for generating analogous musical tones. The electronic musical instrument is characterized by a manually operable input implement for inputting primary performance information such as key touches together with tone pitch information, memory means for memorizing a plurality of different time sequential data patterns representative of prescribed performance information, and interpolating means operative based on the primary performance information inputted by actual operation of the implement for interpolating the time sequential data patterns to retrieve secondary performance information from the memory means, effective to control the sound source.

Each of the different time sequential data patterns is composed of a different sample number of time sequential data. The interpolating means may interpolate the sample number of data as well as the pattern form. The time sequential data patterns may be grouped into a plurality of sections including an attack section, a loop or sustain section and a decay section of the musical sound. In such case, the interpolating means may operate to repeatedly retrieve segmental patterns in the period of the loop section. Further, the interpolating means may be operated by random number control to switch segmented patterns to be retrieved.

According to the invention, the time sequential data patterns are interpolated according to the primary performance information inputted by operation of the performance implement such as a keyboard so as to produce the secondary performance information directly associated to the physical model. Therefore, the performance implement, e.g., keyboard can be effectively adopted to generate musical tones simulative of the continuous vibration type of the mechanical instrument.

In another aspect of the invention, the electronic musical instrument comprises wave generation means, which comprises a loop circuit including a delay circuit, for generating and transmitting a wave signal on said loop circuit, said loop circuit imparting a loop characteristic to said wave signal; performance manner inputting means for inputting performance manner; performance information generating mean responsive to said performance manner for generating performance information whose characteristic varies with time, said loop circuit comprising characteristic modifying means for modifying said loop characteristic in accordance with said performance information so that said wave signal is varied with the modified loop characteristic; and utilizing means for utilizing said wave signal as a musical tone signal.

In a further aspect of the invention, the electronic musical instrument comprises tone characterizing data generating means for generating tone characterizing data characterizing a musical tone to be produced, said tone characterizing data comprising first data and second data which comprise two-dimensional first data and two-dimensional second data respectively, said two-dimensional first data being a pair of first(1)-dimension data and second(1)-dimension data and said two-dimensional second data being a pair of first(2)-dimension data and second(2)-dimension data, and data number of said two-dimensional first data being different from that of said two dimensional second data; and tone generating means for generating a tone signal corresponding to said musical ton in accordance with said tone characterizing data, said tone characterizing data generating means comprising interpolating means for interpolating said two-dimensional first data and said two-dimensional second data and outputting interpolated data which said tone characterizing data is composed of.

In a still further aspect of the invention, the electronic musical instrument comprises tone characterizing data generating means for generating tone characterizing data characterizing a musical tone to be produced, said tone characterizing data comprising first data of two-or-more-dimension and second data of two-or-more-dimension different from said first data at least in data number; and tone generating means for generating a tone signal corresponding to said musical tone in accordance with said tone characterizing data, said tone characterizing data generating means comprising interpolating means for interpolating said first data and said second data and outputting interpolated data which said tone characterizing data is composed of.

DETAILED DESCRIPTION OF THE INVENTION

Figure 1:
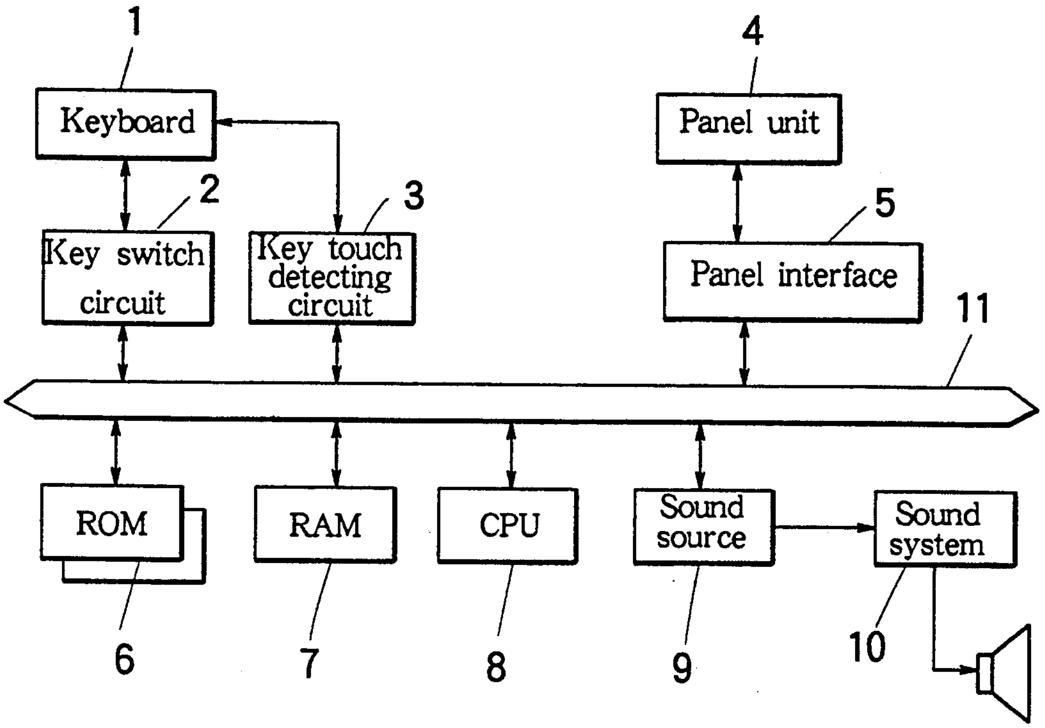
FIG. 1 is a block diagram showing an overall structure of one embodiment of the electronic musical instrument according to the invention.

A preferred embodiment of the present invention will be described in conjunction with the attached drawings. Referring to FIG. 1 which shows an overall construction of an electronic musical instrument according to the invention, the disclosed instrument is comprised of an operating implement in the form of a keyboard 1, a key switch circuit 2 for detecting depression of keys on the keyboard 1, a key touch detecting circuit 3 for detecting key touch representative of primary performance information inputted by the keyboard 1, a panel unit 4 equipped with various switches and a display, a panel interface 5, a read-only memory (ROM) 6, a random access memory (RAM) 7, a central processing unit (CPU) 8, an artificial sound source 9, and a sound system 10. These units are connected to a bidirectional bus line 11. The utilized sound system 10 has a typical construction including a digital/analog converter (D/A converter), a low pass filter and so on, which are regularly utilized in a digital musical instrument.

Figure 2:
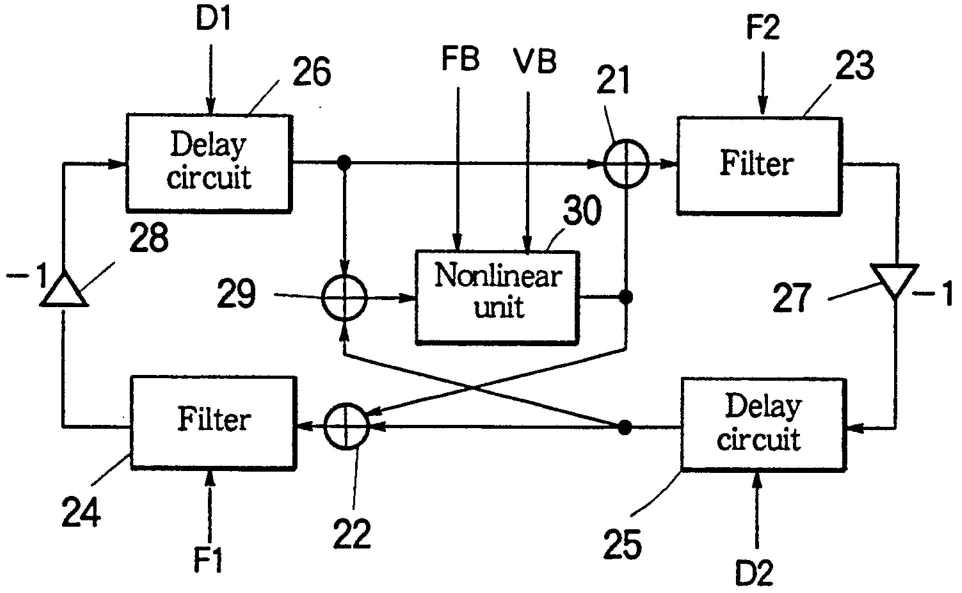
FIG. 2 is a structural block diagram showing an electronic sound source provided in the electronic musical instrument.

FIG. 2 is a block diagram showing a construction of the sound source 9 of FIG. 1. The sound source 9 is comprised of a physical loop model constructed to simulatively produce continuous tones in analogous manner of a mechanical stringed instrument of the bowing type. The sound source includes adders 21, 22 which represent a bowing contact point on an imaginary string. The adder 21 connects to a series of a filter 23, a multiplier 27 and a delay circuit 25 so as to represent a half of the imaginary string from the bowing contact point to one end point. The other adder 22 connects to another series of a filter 24, a multiplier 28 and a delay circuit 26 so as to represent another half of the imaginary string from the bowing contact point to the other end point. The filters 23, 24 are provided to effect low-pass filtering, band-pass filtering or high-pass filtering in desired frequency range according to given parameters F2 and F1 so as to simulate vibrational characteristics of a mechanical string. The delay circuits 25, 26 have, respectively, variable delay factors D2, D1 effective to determine a delay time of this closed loop model. The simulated string has a resonant frequency determined according to the delay time of the closed loop circuit. The multipliers 27, 28 represent reflective coefficients at the opposite end points of the imaginary string. In this embodiment, the reflective coefficient of the string end point is set to "−1". The multipliers 27, 28 may be replaced by an additional filter representative of a reflective coefficient associated to a finger or a bridge.

Figure 3:
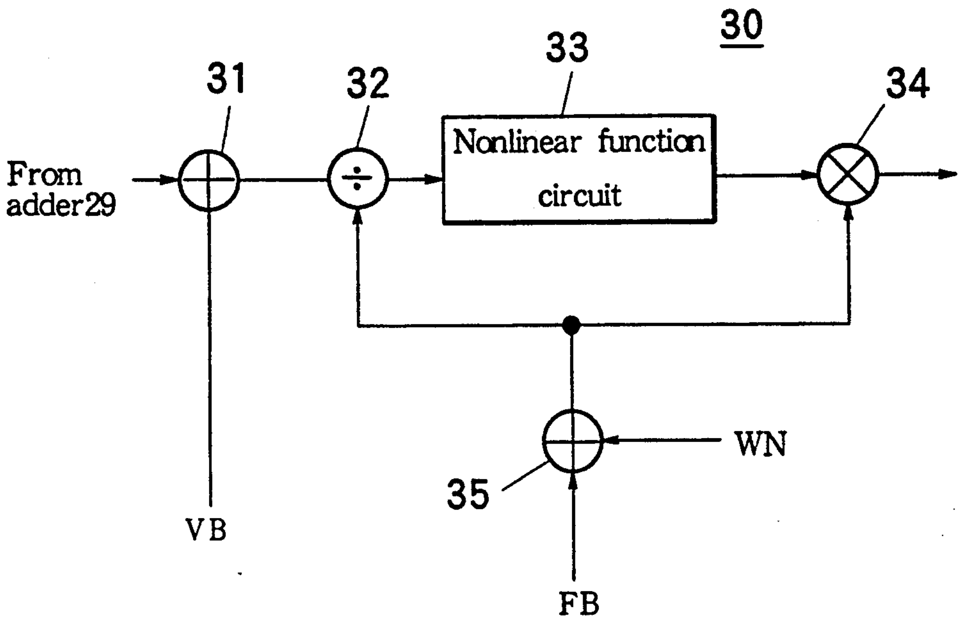
FIG. 3 is a structural block diagram showing a nonlinear unit of the FIG. 2 sound source.

A nonlinear unit 30 is provided to simulate frictional characteristics between a bow and a string. The nonlinear unit 30 is inputted with a synthesized tone signal from an adder 29 which mixes together closed loop outputs from both sides relative to the bowing contact point. The nonlinear unit 30 is further inputted with parameters such as a bowing velocity signal (VB) representative of a relative velocity between a bow and a string, and a bowing force signal (FB) representative of a frictional force between the bow and the string. The nonlinear unit 30 operates according to these inputted signals representative of effective performance information of the physical model sound source so as to feed to the adders 21, 22 a signal simulative of frictional characteristics or stick/slip characteristics FIG. 3 is a block diagram showing a detail of the nonlinear unit 30. There is provided an adder 35 for adding a white noise WN to the bowing force signal (FB) inputted externally. This adder 35 imparts variation to the bowing force FB to realize irregularity of frictional characteristics on the surface of the bow so as to generate music sound full of natural sense. The bowing force signal (FB) mixed with the white noise WN is inputted into both of a divider 32 and a multiplier 34. An adder 31 is disposed before the divider 32 for receiving the signal from the adder 29 shown in FIG. 2 and the bowing velocity signal (VB) to thereby mix together. The resulting mixed signal is inputted into the divider 32. The divider 32 operates to divide the inputted signal by the bowing force signal (FB) mixed with the white noise WN. The divided result is inputted into a nonlinear function circuit 33. An output signal from the circuit 33 is fed to the multiplier 34 so that the output signal is multiplied by the bowing force signal (FB) mixed with the white noise WN. An output signal of the multiplier 34 is fed through both of the adders 21, 22 (FIG. 2) to the closed loop model circuit. By such operation, the sound source can simulate frictional characteristics of a mechanical stringed instrument of the bowing type, i.e., stick/slip characteristics between a bow and a string. Though the white noise WN is mixed to the bowing force signal in the nonlinear unit 30 of FIG. 3 so as to realize irregular characteristics of the bow, alternatively the white noise WN may be added to the bowing velocity signal (VB), or these parameter signals may be multiplied by the white noise WN.

Figure 4:
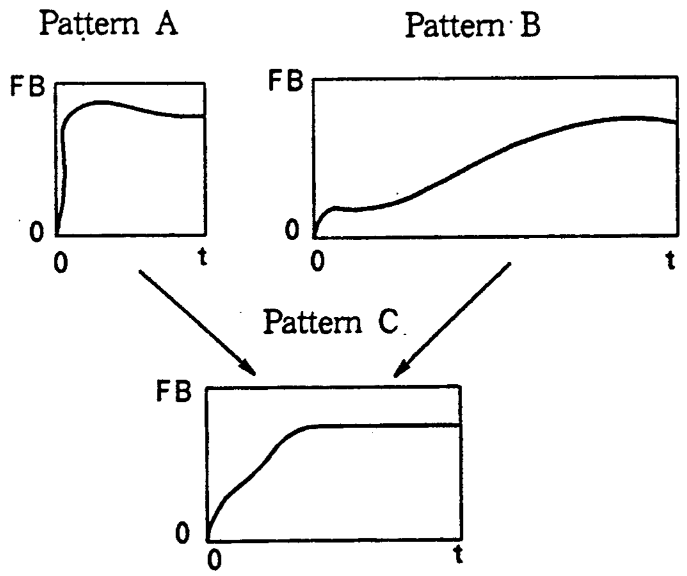
FIG. 4 shows examples of time sequential data patterns representative of bowing force variation, stored in a memory.

FIG. 4 shows examples of bowing force waveforms, i.e., time sequential data patterns of the bowing force FB, which are memorized or stored in a part of the RAM 7 shown in FIG. 1. The pattern A is a prescribed bowing force waveform characterized by quick or fast rising feature in analogous that the bow is drawn with initial pressing force. The pattern B is another prescribed bowing force waveform characterized by slow rising feature in analogous that the bow is drawn without initial pressing force. In the waveform chart, the horizontal axis denotes an operating time t measured from the start of bowing, and the vertical axis denotes the bowing force FB. These waveforms represent an attack section indicative of rising of the bowing force followed by a subsequent sustain section featuring a substantially flat bowing force. The pattern A has a shorter period to reach the sustain section than the pattern B, hence the pattern A has a shorter sample data length than the pattern B. Each pattern is memorized in the digital form of a sequence of bowing force values sampled at given time slots, hence the pattern A is comprised of a less number of sample data than the pattern B. The pattern C is formed by interpolating the patterns A and B. The pattern C has an interpolated waveform shape and a scaled number of sample data, i.e., a scaled data length.

Figure 5:
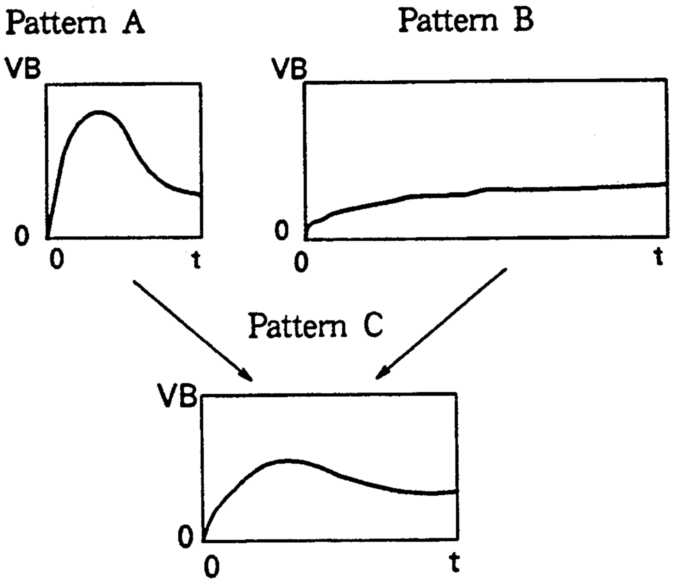
FIG. 5 shows examples of time sequential data patterns representative of bowing velocity variations, stored in a memory.

FIG. 5 shows examples of bowing velocity waveforms, i.e., time sequential data patterns of the bowing, velocity variation, which are utilized as a parameter in this embodiment of the electronic musical instrument, and which are stored in a part of the RAM 7 shown in FIG. 1. The pattern A of FIG. 5 is a bowing velocity waveform corresponding to the pattern A of FIG. 4. The pattern B of FIG. 5 is another bowing velocity waveform corresponding to the pattern B of FIG. 4. In the waveform chart, the horizontal axis denotes a time measured from the start of bowing operation, and the vertical axis denotes a value of the bowing velocity VB. In order to ensure synchronization between controls by the bowing force and the bowing velocity, the corresponding pair of the bowing force waveform and the bowing velocity waveform have the same number of sample data for the same condition of performance. Namely, the waveform pattern A of FIG. 4 is comprised of the bowing force data series containing the same number of sample data as that of the bowing velocity data series which constitutes the waveform pattern A of FIG. 5. In similar manner, the bowing force data series indicative of the waveform pattern B of FIG. 4 has the same number of sample data as that of the bowing velocity data series which defines the waveform pattern B of FIG. 5. The waveform pattern C of FIG. 5 is synthesized by interpolating the patterns A and B of FIG. 5. In another case, the bowing velocity waveform and the bowing force waveform may not have the same data length, and therefore they are comprised of different numbers of sample data.

Figure 6:
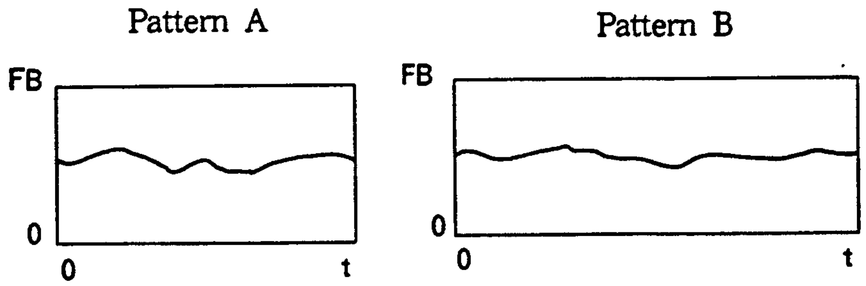
FIG. 6 shows examples of time sequential data patterns representative of bowing force variations in a sustain period.

FIG. 6 shows examples of sustain segments of the bowing force waveforms stored in the present embodiment of the inventive musical instrument. In this embodiment, the sustain section subsequent to the attack section is set such that the bowing force is delicately varied as shown in the Figure while the bowing velocity is fixed for the simplicity, thereby realizing natural sound generation. The sustain segments are repeatedly retrieved to form a continuous loop section or the sustain section subsequent to the attack section. In order to smoothly connect each sustain segment, the segmental waveform has the same bowing force value at both ends thereof. Further, this end value is set identical to the last value of the attack waveforms of FIG. 4 stored in the bowing force waveform memory. By such settings, the attack section can be smoothly connected to the following loop or sustain section. If the same sustain segment were simply repeated, the resulting loop section might be rather monotonous, or even worse the loop section might have a low frequency noise corresponding to repetition cycle of the same sustain segment. Therefore as shown in FIG. 6, this embodiment utilizes different patterns A, B of the sustain segmental waveforms having different numbers of sample data. These segmental patterns A, B are retrieved by random manner so as to avoid mixing of a low frequency noise.

Next, the description is given for various registers utilized in this embodiment of the electronic musical instrument. Registers are identified by individual labels, and the same label is also used to denote a content of the corresponding register in the following description and the associated flow charts.

(1) A register st is a state register indicative of the operating state in a given performance period. The register st takes selectively, value "0" indicative of retrieval state of the attack section, value "1" indicative of retrieval state of the sustain section, and value "2" indicative of the retrieval state of the decay section. During the attack state, as shown in FIGS. 4 and 5, the synthesized bowing force waveform and the synthesized bowing velocity waveform are, respectively, interpolatively retrieved to feed the effective performance information to the sound source. During the sustain state, as shown in FIG. 6, different bowing force waveforms are repeatedly retrieved on random choice basis to feed the effective performance information to the sound source. In the decay state, the sound generation is gradually ceased after repeated retrieval of the sustain segments. During the decay state, the bowing force waveforms and the bowing velocity waveforms are, respectively, interpolated as shown in FIGS. 4 and 5. Then the interpolated waveforms in the form of sample data series are retrieved in reverse sequence in contrast to the forward retrieval sequence during the attack state to thereby feed the sound source with the effective performance information.

(2) A register c functions as an address counter for use in sequential data retrieval of the waveforms shown in FIGS. 4–6.

(3) A register T is provided for storing waveform interpolation information for use in interpolation of the waveforms. In this embodiment, the waveform interpolation information is given in the form of primary touch performance information including initial touches and key-off touches manually inputted from the keyboard. The register T takes gradated values from "0" to "127".

(4) A register KC is called "key code register" for storing key codes corresponding to keys on event.

(5) A register t is called "time information register" for counting a time interval from an occurrence of key-on event.

(6) A register AT is provided for storing after touch information during the key event.

Figure 7:
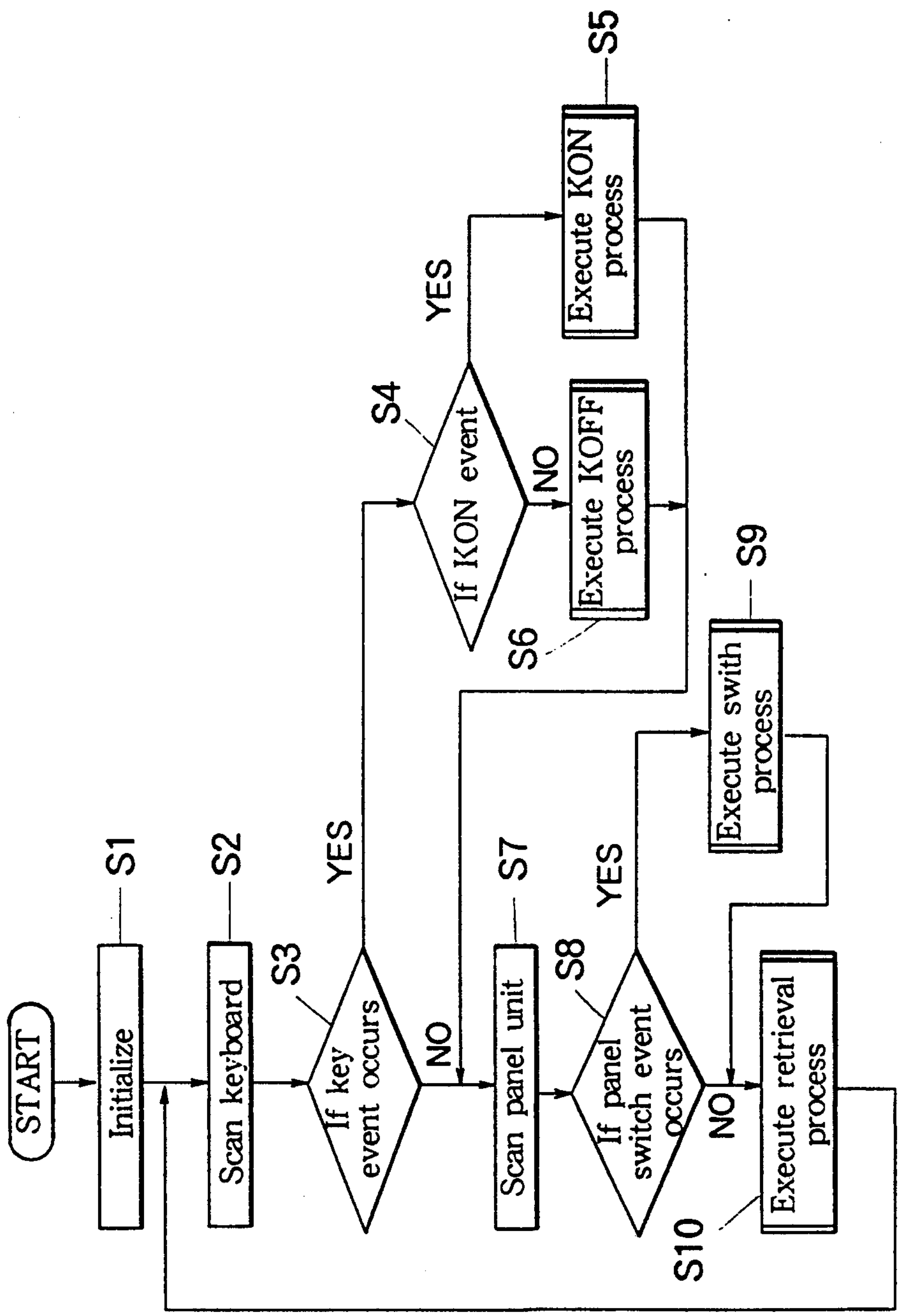
FIG. 7 is a flow chart illustrative of a main process routine in the electronic musical instrument.

FIG. 7 is a flow chart illustrative of the main process routine executed in the present embodiment of the electronic musical instrument. At the start of the operation in the instrument, step S1 is carried out for initialization such as to set initial values in the various registers. Next in step S2, the keyboard 1 is scanned to detect key operation. Then, check is made in step S3 as to whether a key event occurs. If key event has occurred, the processing advances to branch step S4. On the other hand, if key event has not occurred, the processing advances to subsequent step S7. In this stage, the register KC is stored with a key code indicative of the particular key on event. Further, the touch information is also stored in the assigned registers. Particularly, the after touch information is stored in the register AT.

Figure 8:
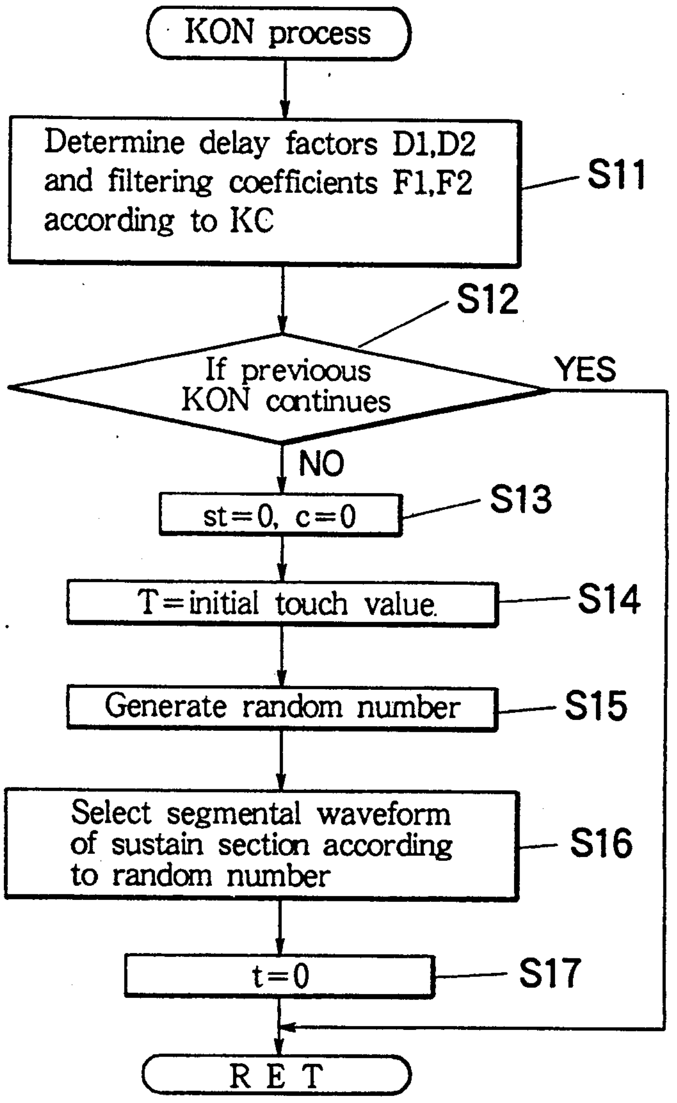
FIG. 8 is a flow chart illustrative of a key-on process routine in the electronic musical instrument.
Figure 9:
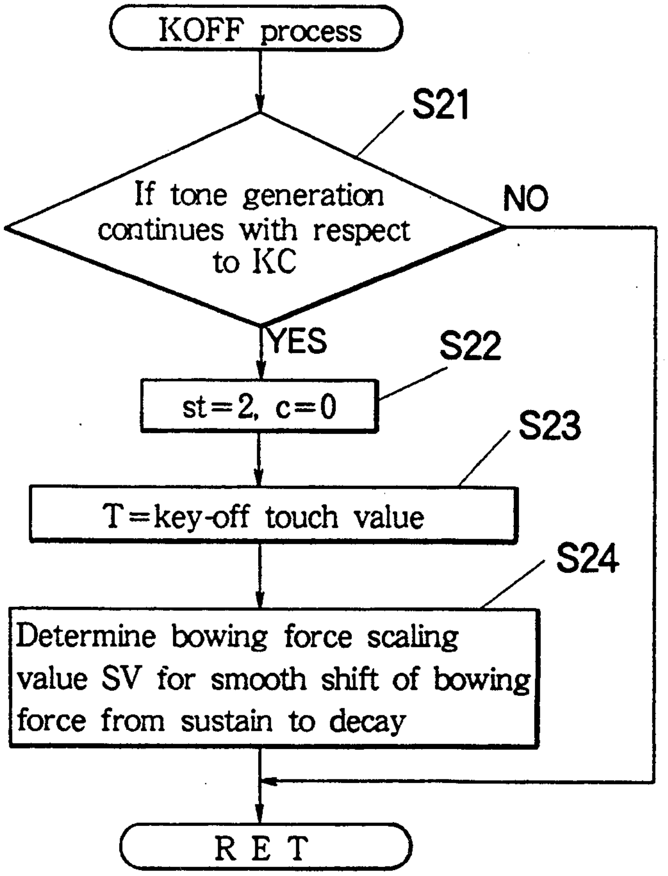
FIG. 9 is a flow chart illustrative of a key-off process routine in the electronic musical instrument.

Check is made in step S4 as to if the detected key event is of key-on operation (hereinafter, referred to as "KON"). If key-on event is held, step S5 is selected to execute KON process, detail of which is illustrated in FIG. 8. On the other hand, if it is held that the detected event is not the key-on event, i.e., the key-off operation (hereinafter referred to as "KOFF") has occurred, step S6 is selected to execute KOFF process, detail of which is illustrated in FIG. 9. Processing proceeds to step S7 after steps S5 or S6.

Figure 10:
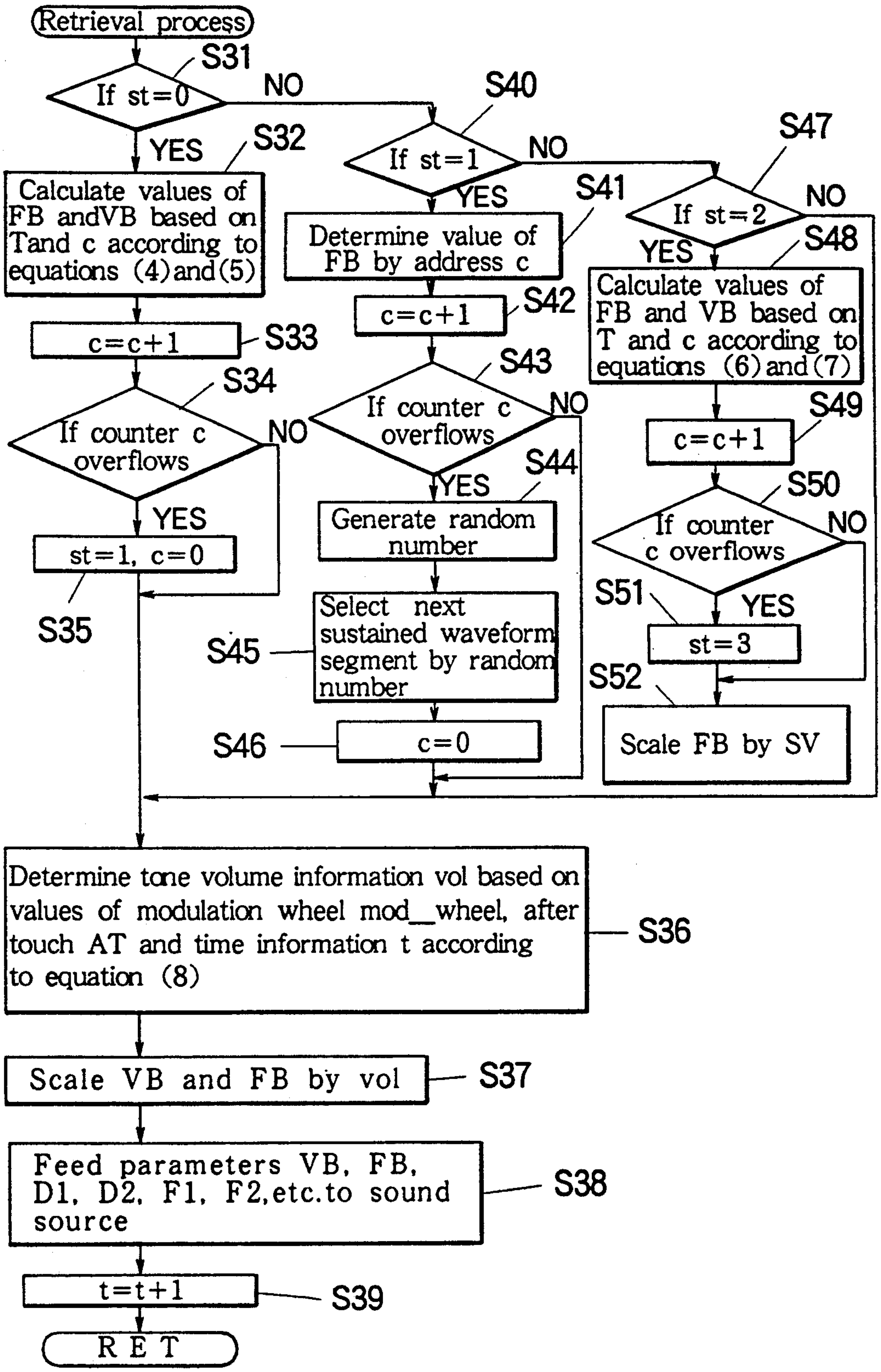
FIG. 10 is a flow chart illustrative of a data retrieval process routine in the electronic musical instrument.

In step S7, panel unit scanning is carried out to detect a switch event on the panel unit 4. Then, check is made in subsequent step S8 as to whether a switch event has occurred. If a switch event has occurred on the panel unit, switch process or panel process is effected in step S9 to thereby proceed to step S10. In the switch process, there can be carried out generally selection of tone colors and setting of various effects in the electronic musical instrument. If it is held in step S8 that there is no panel switch event, processing advances straightforward to step S10. Step S10 is executed to carry out sampling retrieval of the time sequential data patterns shown in FIGS. 4-6 to feed the retrieved data to the sound source. Detail of the retrieval process is illustrated in FIG. 10. After step S10, processing returns to step S2 to thereby repeatedly carry out the above described main routine.

Next, the KON process routine will be described, referring to the flow chart of FIG. 8. When initiating KON process routine upon detection of a key-on signal, firstly step S11 is carried out to determine the delay factors D1, D2 of the delay circuits 26, 25 and the filtering coefficients F1, F2 of the filters 24, 23 in the sound source 9 (FIG. 2) according to the key code KC assigned to the depressed key. Next, check is made in step S12 as to whether a previous key-on operation is continuously held. If the previous key depression is held as it is, processing is jumped to simply return. By such operation, the music tone is continuously generated with changing ton pitch according to the current key depression and without varying bowing force and bowing velocity regardless of key touch. Such operation is intended to simulate the slur performance of a stringed musical instrument, by means of the keyboard. Practically, one key is depressed while another key has kept on so as to effect the slur between the depressed keys.

On the other hand, if it is held in step S12 that the previous key-on state is discontinued, step S13 is carried out so that the register st indicative of the state of performance is set with "0" to designate the data retrieval from the attack waveform, and so that the address counter c is set with "0" for the sequential data retrieval. Then, step S14 is carried out so as to set the detected initial key touch value to the waveform interpolation information register T for interpolation of the waveforms. Further, step S15 is carried out to generate a random number. Subsequently, step S16 is carried out so as to select a first segmental waveform for the loop or sustain section according to the generated random number. Further in step S17, the time register t is reset to "0" or cleared, thereby returning.

Next, the KOFF process routine is described with reference to the FIG. 9 flow chart. In the KOFF process routine, firstly step S21 is carried out so as to check as to if tone generation is continued with respect to the key code stored in the key code register KC. If the tone generation has been ceased with respect to the stored key code KC, for example, in case that previously depressed key is released during the slur performance, there is nothing to do so that processing returns. On the other hand, if it is held in step S21 that the tone generation is continued with respect to the stored key code KC, processing advances to step S22 so as to carry out stop operation of the tone generation. Namely in step S22, the state register st is set with "2" indicative of the decay state, and the address counter c is cleared to zero. Next in step S23, the waveform interpolation information register T is set with a value of key-off touch for interpolation of the waveform. Then, step S24 is carried out to determine a bowing force scaling value SV for use in smoothly shifting from the current bowing force of the sustain section to that of the decay section, and thereafter processing returns.

In this embodiment, the waveform of the attack section is reversely retrieved for the simplicity so as to form a waveform in the decay state to cease the tone generation. On the other hand, the bowing force waveform of the sustain segment contains fluctuation as shown in FIG. 6 to impart delicate variation. Accordingly, when a key-off event occurs interruptively during the course of continuous retrieval of sample data in the sustain period, the last retrieved sample datum is not generally coincident with the first bowing force datum of the decay waveform (i.e., the last sample data of the attack waveform), whereby the sustain section may not smoothly connect to the decay section. In order to avoid such discontinuation, the step S24 is carried out to calculate ratio of the bowing force value at the time of key-off operation and the last bowing force value of the attack waveform to determine the scaling value SV. In the subsequent data retrieval process, the value of bowing force FB is multiplied by the scaling value SV to effect scaling to thereby smoothly connect the waveform from the sustain section to the decay section.

Next, the retrieval process routine is described with reference to the flow chart of FIG. 10. In the data retrieval routine, firstly check is made in step S31 as to whether the state register st stores the flag "0". In case that the state register st does not indicate "0", processing is branched to step S40. On the other hand, in case that the state register st holds "0", processing advances to step S32 in order to carry out data retrieval from the attack waveforms. In step S32, for the data retrieval from the attack waveforms, interpolation is carried out such that the values of the bowing force FB and the bowing velocity VB are calculated based on the contents of the waveform interpolation information register T and the address counter c. The calculation is effected according to the following relations:

$$VB\_a\_T\_data\_num = (T/127) \times VB\_a\_fast\_data\_num + \{(127-T)/127\} \times VB\_a\_slow\_data\_num \quad (1)$$

$$x\_fast = c \cdot VB\_a\_fast\_data\_num / VB\_a\_T\_data\_num \quad (2)$$

$$x\_slow = c \cdot VB\_a\_slow\_data\_num / VB\_a\_T\_data\_num \quad (3)$$

$$VB = (T/127) \times VB\_a\_fast(x\_fast) + \{(127-T)/127\} \times VB\_a\_slow(x\_slow) \quad (4)$$

$$FB = (T/127) \times FB\_a\_fast(x\_fast) + \{(127-T)/127\} \times FB\_a\_slow(x\_slow) \quad (5)$$

Hereinbelow, detailed description is given for the calculation of the values of bowing force FB and the bowing velocity VB according to the above relations (1)-(5). In the relation (1), VB_a_fast_data_num denotes a number of the time sequential sample data contained in the fast rising pattern A (shown in FIG. 5) of the bowing velocity waveform, i.e., data length of the pattern A of FIG. 5. VB_a_slow_data_num denotes a number of the time sequential sample data contained in the slow rising pattern B (shown in FIG. 5) of the bowing velocity waveform, i.e., data length of the pattern B of FIG. 5. The interpolated or scaled sample data number VB_a_T_data_num is determined according to the relation (1) by scaling based on the content of the waveform interpolation information register T. This register T stores the initial touch datum gradated in the range of "0"-127" representative of the initial key touch effect. Therefore, scaling is effected according to the key touch between the great data length contained in the FIG. 5 pattern B and the small data length contained in the FIG. 5 pattern A to obtain the effective data length (as shown in the pattern C of FIG. 5) indicative of the number of sample data of the scaled waveform.

The address counter c sequentially operates to count up from the initial value "0" to the effective data number VB_a_T_data_num. In the relation (2), the count value c is multiplied by (VB_a_fast_data_num/VB_a_T_data_num) to determine a retrieval address x_fast of the bowing velocity datum contained in the fast rising waveform pattern A of FIG. 5. In similar manner according to the relation (3), another retrieval address x_slow is determined for the retrieval of the bowing velocity datum contained in the slow rising waveform pattern B of FIG. 5.

In the relation (4), VB_a_fast denotes the datum retrieved from the bowing velocity data sequence contained in the fast rising waveform pattern A of FIG. 5. VB_a_slow denotes the other bowing velocity datum retrieved from the bowing velocity data sequence contained in the slow rising waveform pattern B of FIG. 5. According to the relation (4), the original bowing velocity datum VB_a_fast (x_fast) retrieved by the address x_fast is truncated by weight T/127 according to the key touch, and the other original bowing velocity datum VB_a_slow (x_slow) retrieved by the address x_slow is truncated by weight (127−T)/127. These truncated values are added together to calculate an effective datum of the bowing velocity VB.

In the relation (5), FB_a_fast denotes an original bowing force datum retrieved from the data sequence contained in the fast rising waveform pattern A of FIG. 4, and FB_a_slow denotes another original bowing force datum retrieved from the data sequence contained in the slow rising waveform pattern B of FIG. 4. According to the relation (5), in manner similar to the relation (4), FB_a_fast (x_fast) retrieved by the address x_fast is truncated by the weight T/127 and FB_a_slow (x_slow) retrieved by the address x_slow is truncated by the weight (127−T)/127 so that these truncated values are added together to calculate an effective datum of the bowing force FB.

As understood from the above description, when a key is quickly depressed on the keyboard to increase the effect of initial touch, there can be interpolatively obtained the effective bowing force waveform containing much contribution from the fast rising pattern A of FIG. 4 and the effective bowing velocity waveform containing much contribution from the fast rising pattern A of FIG. 5. On the other hand, when a key is slowly depressed o the keyboard to decrease the effect of initial touch, there can be interpolatively obtained the effective bowing force waveform contributed much from the slow rising waveform B of FIG. 4 and the effective bowing velocity waveform contributed much from the slow rising waveform B of FIG. 5.

Returning to FIG. 10, further description is given for subsequent step S33 and following steps. After step S32, the address counter c is incremented in step S33. Then, check is made in step S34 as to if the counter c overflows. This check is tested according to the relation c>VB_a_T_data_num. If it is held in step S34 that the counter c overflows, this means that data retrieval from the waveform of the attack section is finished so that the following waveform of the sustain or loop section should be processed. Therefore, in step S35, the state register st is set with "1" and the counter c is zero-cleared, thereby proceeding to step S36. On the other hand, if it is held in step S34 that the counter c does not yet overflow, processing jumps to step S36.

If it is held in step S31 that the sate register st does not indicate "0", then check is made in step S40 as to whether the state register st is set with "1". In case of st≠"1", processing branches to step S47. On the other hand, in case of st="1", processing advances to step S41 so as to carry out data retrieval of the loop section. In step S41, a value of the bowing force FB is determined directly according to the count value of address counter c by the relation FB=FB_S(c), where FB_S denotes a sample datum contained in the bowing force segmental pattern A or B of FIG. 6 representative of the sustain section waveform. The segmental pattern is prescribed in the sustain section so that the serial datum of bowing force is sequentially and automatically addressed by means of the counter c. Meanwhile, the bowing velocity is held constant in the sustain state without variation so that the last value of the bowing velocity at the termination of the attack state is maintained as it is during the sustain state.

After step S41, the address counter c is incremented in step S42. Then, check is made in subsequent step S43 as to whether the counter c overflows according to the test relation c>FB_S_data_num, where FB_S_data_num denotes a number of sequential data contained in the bowing force pattern A or B of FIG. 6 representative of the waveform of a different sustain segment.

If it is held that the counter c overflow or the counter c reaches the full number of the sequential data, this means that the current retrieval of the bowing force datum is finished with respect to a selected sustain segment. Therefore, processing advances to step S44 so as to initiate data retrieval from the next sustain segment. On the other hand, if it is held in step S43 that the counter c does not yet overflow, processing jumps to step S36. Step S44 is carried out to generate a random number. Then, subsequent step S45 is executed to select a next sustain waveform segment containing a sequence of data FB_S according to the generated random number. Further, the address counter c is zero-cleared in step S46, thereby proceeding to step S36.

In step S47, check is made as to if the state register st is set with "2". In case of st≠"2", processing simply returns. On the other hand, in case of st="2", processing advances to step S48 so as to effect data retrieval of the decay section. In step S48, interpolation is carried out for data retrieval of the decay section, hence the values of bowing force FB and bowing velocity VB are calculated with using the waveform interpolation information register T and the address counter c according to the following relations (6) and (7):

$$VB = (T/127) \times VB\_a\_fast\,(VB\_a\_fast\_data\_num - x\_fast) + \{(127-T)/127\} \times VB\_a\_slow\,(VB\_a\_slow\_data\_num - x\_slow) \quad (6)$$

$$FB = (T/127) \times FB\_a\_fast\,(FB\_a\_fast\_data\_num - x\_fast) + \{(127-T)/127\} \times FB\_a\_slow\,(FB\_a\_slow\_data\_num - x\_slow) \quad (7)$$

The values of bowing force FB and bowing velocity VB are calculated for the decay state according to the relations (6), (7) basically in manner similar to the calculation according to the before described relations (4), (5) used for the attack state. However, the significant difference is that the time sequential data are retrieved reversely as opposed to the calculation by relations (4), (5). For this, the pair of sequences of bowing velocity data VB_a_fast and VB_a_slow are, respectively, retrieved by reverse addresses VB_a_fast_data_num−x_fast and VB_a_slow_data_num−x_slow in place of the forward addresses x_fast and x_slow. The reverse address is defined by subtracting the forward address from the total number of the scaled sequential data. The same is true with respect to the addressing of the sequence of the bowing force data in calculation according to the relation (7).

After step S48, the address counter c is incremented in step S49. Then, check is made in step S50 as to if the counter c overflow according to the test relation c>VB_a_T_data_num. If it is held in step S50 that the counter c overflow, this means that the sequential data retrieval of the decay section should be terminated. Therefore, the state register st is loaded with "3", thereby advancing to step S52. In turn, if it is held in step S50 that the address counter c does not yet overflow, processing jumps to step S52. In order to smoothly connect the bowing force waveform of the decay section to that of the sustain section, step S52 is carried out to scale the value of the bowing force FB according to the bowing force scale value SV, thereby proceeding to step S36. While the scaling is effected for the bowing force value in order to ensure smooth connection according to the scaling factor SV, the bowing velocity is not scaled since the bowing velocity is held constant during the sustain section as described before.

Step S36 is executed for calculating tone volume information vol based on a value of a modulation wheel mod_wheel, the after touch AT and the time information t according to the following relation (8):

$$vol = mod\_wheel \times G\,(1-t/\alpha) + AT \times (t/\alpha - G\,(t/\alpha - 1)) \quad (8)$$

where $$G(x) = \begin{cases} 0 & x \leqq 0 \\ x & x > 0 \end{cases}$$

Figure 11:
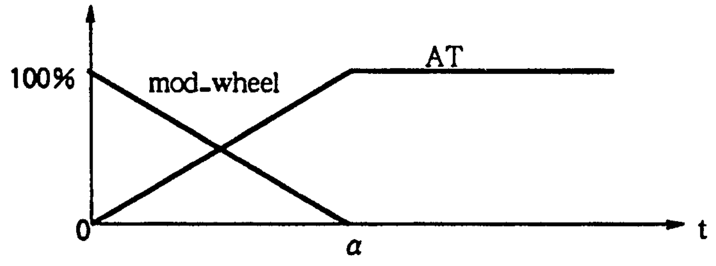
FIG. 11 is a graph illustrative of a tone volume setting operation in the inventive electronic musical instrument.

In this embodiment, the tone volume is set according to the modulation wheel and the after touch. In this regard, FIG. 11 is a graph showing a variable multiplying factor G (1−t/α) of the modulation wheel value mod_wheel and another variable multiplying factor (t/α−G(t/α−1)) of the after touch AT, represented in the relation (8). Namely, these factors represent weights effective to determine how to contribute the modulation wheel and the after touch to the tone volume information vol. As understood from the FIG. 11 diagram, immediately after the key depression (t α), the modulation wheel dominantly controls the setting of tone volume. As the passage of time from the key depression, the after touch gradually influences to the setting of tone volume. Practically at the start of sound generation, the weight of 100% is applied to the value of modulation wheel mod_wheel which is operated by the player of the musical instrument and the weight of 0% is applied to the value of after touch so as to calculate the tone volume information vol indicative of a tone volume at the top portion of the attack section. Thereafter, the weight of the modulation wheel is gradually decreased while the other weight of the after touch is gradually increased. After passage of the predetermined time α, the modulation wheel is weighted by 0% and the after touch AT is weighted by 100% so as to calculate the tone volume information vol.

The typical keyboard cannot discriminate between force and velocity of a depressed key. Therefore, when applied as an input implement for the artificial string instrument of bowing type, the keyboard cannot input separately the bowing velocity information and the bowing force information. In view of this, the present embodiment is constructed such that the bowing force and the bowing velocity are estimated based on the initial touch and the key-off touch according to the before-mentioned relations (4), (5), (6) and (7) while the tone volume is determined based on the modulation wheel and the after touch according to the relation (8). In this regard, the curve indicative of the modulation wheel effect is set to fade across the rising curve of the after touch effect as shown in FIG. 11. If only the modulation wheel were effective during a stable period or loop period in which the waveforms of sustain segment are repeatedly retrieved, the tone volume would be fixed constantly. In order to avoid such artificiality, the after touch effect is added to vary the tone volume even during the sustain period. Namely, additional force is manually applied to a key after its depression so as to vary o regulate the tone volume. Such operation method can well simulate the performing method of a continuous tone type musical instrument.

Returning again to FIG. 10, the description is given for subsequent steps after step S36. Step S37 is carried out to scale the values of bowing velocity VB and the bowing force FB according to the tone volume information vol. In order to avoid discontinuation of the sound generation due to excessive reduction in the bowing velocity VB and bowing force FB by scaling, when the scaled bowing velocity VB and the bowing force FB fall in an ineffective range, the values of bowing velocity VB and bowing force FB are adjustably shifted to an effective range in step S37. Then, step S38 is executed to feed the parameter values of bowing velocity VB, bowing force FB, delay factors D1, D2 and filtering coefficients F1, F2 to the sound source 9. Further, step S39 is carried out to increment the time information indicative of the time interval counted from the key-on event, thereby returning.

Though the address counter c is incremented one by one in steps S33, S42 and S49, it may be expedient to increment the counter c by a given fractional unit, so as to contract the memorized waveforms. Further, the waveform may be subjected to thinned-out retrieval operation. Moreover, randomized number information may be superposed during the accumulative counting operation of the address counter c, thereby achieving more natural generation of continuous music tones. The randomized information may be formed of simple white noises or complicated random number system.

Though different waveforms are selectively retrieved during the sustain period in the disclosed embodiment, it may be expedient to repeatedly retrieve a single waveform of the sustain segment for the simplification. Although the bowing velocity is fixed during the sustain period in the present embodiment, it may be feasible to memorize and retrieve a sustain waveform representative of the bowing velocity as well as the bowing force. The modulation wheel is utilized to set the tone volume in the present embodiment; however, the modulation wheel may be adopted to regulate the bowing force. The tone volume is set by scaling the bowing force and bowing velocity in steps S36 and S37; however, additional waveforms of the physical model performance information may be provided dependently on the bowing velocity and the additional waveforms may be interpolated in similar manner to determine the final waveform of the performance information. The interpolation is effected between the pair of fast rising waveform and the slow rising waveform in the above described embodiment; however the effective waveform may be synthesized from more number of original waveforms. Further, it may be feasible to provide fortissimo (ff) waveform and pianissimo (pp) waveform besides the discrimination between the fast rising waveform and the slow rising waveform for more efficient interpolation. The linear interpolation is adopted in the instant embodiment; however, other modes of interpolation may be utilized. The sequential data retrieval process of FIG. 10 is included within the loop process of the main routine of FIG. 7 in the instant embodiment; however, the retrieval process may be conducted by interruptive operation by CPU. The prescribed performance information is given in the PCM waveform in this embodiment; however, a differential PCM waveform may be adopted for the data contraction. Besides the sustain section, a plurality of attack waveforms having different data lengths may be stored and alternatively selected on random basis. The present embodiment is directed to physical simulation of the stringed instrument of bowing type typically generating continuous music tones; however, the present invention can be applied to physical simulation of various wind instruments. Moreover, the present invention is not limited to the physical simulation of mechanical instrument, but may be utilized in other sound sources such as FM sound source. In addition, it may be expedient to introduce edit operation of waveform data. Further, multiple tones can be generated by adopting time sharing multiplex operation.

As described above, according to the present invention, the electronic musical instrument efficiently utilizes a keyboard as a performing implement for enabling the musical instrument to produce continuous music tones. Namely, the electronic musical instrument is constructed such as to retrieve waveforms from a memory and to interpolate the retrieved waveforms according to the manipulation manner of the keyboard to thereby provide physical model performance information. By such construction, the physical model sound source can be effectively operated to generate continuous musical tones analogous of a mechanical instrument.

What is claimed is:

1. An electronic musical instrument comprising:

an artificial sound source including a loop circuit which is controllable according to tone pitch information and a characteristic parameter of the loop circuit for generating a wave signal representative of a musical tone;

input means for inputting primary performance information and tone pitch information;

memory means for storing a prescribed parameter in the form of a plurality of different time sequential data patterns; and interpolating means operative to access the memory means for carrying out interpolation of the different time sequential data patterns according to the inputted primary performance information so as to produce secondary performance information containing a characteristic parameter effective to control the loop circuit to generate the wave signal modified in accordance with the characteristic parameter.

2. An electronic musical instrument according to claim 1, wherein the interpolating means includes means for interpolating data length between the time sequential data patterns having different data lengths.

3. An electronic musical instrument according to claim 1, wherein the memory means has means for storing a plurality of time sequential data patterns including those representative of an attack section and a sustain section of the musical sound.

4. An electronic musical instrument according to claim 3, wherein the interpolating means includes means for repeatedly retrieving particular time sequential data patterns to form the sustain section.

5. An electronic musical instrument according to claim 3; wherein the interpolating means includes means for reversely retrieving the time sequential data patterns of the attack section so as to form a time sequential data pattern representative of a decay section of the musical sound.

6. An electronic musical instrument comprising:

wave generation means including a loop circuit having a delay element for generating and transmitting a wave signal in said loop circuit, said loop circuit imparting a loop characteristic to said wave signal;

performance manner inputting means for inputting performance manner;

performance information generating means responsive to said performance manner for generating performance information containing a time sequential data pattern whose characteristic data value varies with time, wherein said loop circuit includes characteristic modifying means for modifying said loop characteristic in accordance with said performance information so that said wave signal is varied by the modified loop characteristic with time; and utilizing means for utilizing said wave signal as a musical tone signal.

7. An electronic musical instrument according to claim 6 wherein said loop circuit comprises:

control signal generating means for generating a control signal; and transmission path means having a transmission path whose ends are an input terminal and an output terminal connected t said control signal generating means, for transmitting said wave signal responsive to said control signal, said control signal being responsive to said wave signal.

8. An electronic musical instrument according to claim 7 wherein said control signal generating means receives said wave signal and imparts a non-linear loop characteristic to the received wave signal to generate said control signal.

9. An electronic musical instrument according to claim 7 wherein said control signal generating means generates said control signal in response to said performance information.

10. An electronic musical instrument according to claim 7 wherein said delay circuit is included in said transmission path means, said transmission path further including a filter circuit for modifying a frequency-amplitude characteristic of said wave signal.

11. An electronic musical instrument according to claim 6 wherein said performance information generating means comprises:

memory means for storing said performance information which is read out in response to said performance manner.

12. An electronic musical instrument according to claim 6 wherein said performance information generating means comprises:

memory means for storing first performance information and second performance information different from said first information; and information operation means for carrying out an operation on said first performance information said and second performance information in accordance with said performance manner and for outputting an operation result as said performance information.

13. An electronic musical instrument according to claim 6 wherein said performance information generating means comprises:

first generating means for generating first performance information;

second generating means for generating second performance information different from said first performance information; and information operation means for carrying out an operation on said first performance information and said second performance information in accordance with said performance manner and outputting an operation result as said performance information.

14. An electronic musical instrument according to claim 13 wherein said information operation means includes interpolating means for carrying out interpolation of said first performance information and said second performance information in accordance with said performance manner and for outputting an interpolated result as said performance information.

15. An electronic musical instrument according to claim 14 wherein:

said first performance information and said second performance information comprise two-dimensional information; and said interpolating means includes means for carrying out two-dimensional interpolation on said first performance information and said second performance information.

16. An electronic musical instrument according to claim 6 wherein said performance information comprises a first portion and a second portion different from said first portion.

17. An electronic musical instrument according to claim 16 wherein said first portion corresponds to an attack portion of said musical tone signal and said second portion corresponds to a sustained portion of said musical tone signal.

18. An electronic musical instrument according to claim 6 further comprising:

random signal generating means for generating a random signal whose value varies randomly, wherein said performance information means generates generating said performance information in accordance with said random signal.

19. An electronic musical instrument according to claim 18 wherein said performance information comprises plural pieces of information different from each other, further comprising:

selecting means for selecting one from among said plural pieces of information in accordance with said random signal and for outputting said selected one as a part or whole of said performance information.

20. An electronic musical instrument according to claim 6 wherein said performance manner inputting means includes a performance operating member.

21. An electronic musical instrument according to claim 20 wherein said performance manner inputting means comprises:

performance manner detecting means for detecting said performance manner which is conducted via said performance operating member.

22. An electronic musical instrument according to claim 20 further comprising a keyboard having one or more keys, said performance operating member being a keyboard's key wherein said performance manner represents a degree of touch to said key.

23. An electronic musical instrument comprising:

tone characterization data generating means for generating tone characterization data characterizing a musical tone to be produced, said tone characterizing data being a composite of first data and second data which comprises two-dimensional first data and two-dimensional second data respectively, said two-dimensional first data being a pair of first(1)-dimension data and second(1)-dimension data and said two-dimensional second data being a pair of first(2)-dimension data and second(2)-dimension data, and data number of said two-dimensional first data being different from that of said two-dimensional second data; and tone generating means including a loop circuit for generating a wave signal corresponding to said musical tone in accordance with said tone characterizing data, wherein said tone characterizing data generating means includes interpolating means for interpolating said two-dimensional first data and said two-dimensional second data with each other and outputting the interpolated data to form tone characterizing data, and said loop circuit includes modifying means for modifying said wave signal transmitting through said loop circuit according to said tone characterizing data.

24. An electronic musical instrument according to claim 23 wherein said interpolating means interpolates said first(1)-dimension data and first(2)-dimension data based on data number of said two-dimensional first data and data number of two-dimensional second data.

25. An electronic musical instrument according to claim 23 wherein said first(1)-dimension data and said first(2)-dimension data represent amplitude respectively and said second(1)-dimension data and said second(2)-dimension data represent time respectively.

26. An electronic musical instrument comprising:

tone characterization data generating means for generating tone characterization data characterizing a musical tone to be produced, said tone characterizing data being a composite of first data of two-or-more-dimensions and second data of two-or-more-dimensions different from said first data at least in data number; and tone generating means including a loop circuit for generating a wave signal corresponding to said musical tone in accordance with said tone characterizing data, wherein said tone characterizing data generating means includes interpolating means for interpolating said first data and said second data with each other and outputting the interpolated data to form tone characterizing data, and said loop circuit includes modifying means for modifying said wave signal transmitting through said loop circuit according to said tone characterizing data.

27. An electronic musical instrument according to claim 26 wherein said interpolating means interpolates said first data and said second data in accordance with data number of said first data and data number of said second data.

* * * * *